(12) United States Patent
Govindaraman (10) Patent No.: US 7,460,535 B2
(45) Date of Patent: Dec. 2, 2008

(54) DEVICE AND METHOD THAT ALLOWS SINGLE DATA RECOVERY CIRCUIT TO SUPPORT MULTIPLE USB PORTS

(75) Inventor: Ravikumar Govindaraman, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 1023 days.

(21) Appl. No.: 10/323,214

(22) Filed: Dec. 18, 2002

(65) Prior Publication Data

US 2004/0153696 A1 Aug. 5, 2004

(51) Int. Cl.
*H04L 12/28* (2006.01)
*G06F 11/00* (2006.01)

(52) U.S. Cl. .............. 370/392; 370/230.1; 370/235; 710/313; 714/4

(58) Field of Classification Search ......... 370/216–228, 370/389, 392, 384, 230.1–235; 710/15–19, 710/100, 313; 714/4–6, 25, 44, 776; 375/316
See application file for complete search history.

(56) References Cited

U.S. PATENT DOCUMENTS

| 5,144,297 | A | * | 9/1992 | Ohara ...................... 340/2.26 |
| 6,008,680 | A | * | 12/1999 | Kyles et al. ................ 327/277 |
| 6,732,218 | B2 | * | 5/2004 | Overtoom et al. ........... 710/313 |
| 6,859,645 | B2 | * | 2/2005 | Yu ............................. 455/222 |
| 7,209,525 | B2 | * | 4/2007 | Laturell et al. .............. 375/316 |
| 2002/0061016 | A1 | * | 5/2002 | Mullaney et al. ............ 370/384 |

* cited by examiner

*Primary Examiner*—Afsar M. Qureshi
(74) *Attorney, Agent, or Firm*—Bever, Hoffman & Harms, LLP; Jeanette S. Harms (57) ABSTRACT

A method and apparatus for routing data in a device having a plurality of parts. A signal is received at a first port. A detection is made that the first port received the signal. Information contained in the signal is selectively routed from the first port to a data recovery circuit.

28 Claims, 5 Drawing Sheets

DEVICE AND METHOD THAT ALLOWS SINGLE DATA RECOVERY CIRCUIT TO SUPPORT MULTIPLE USB PORTS

BACKGROUND OF THE INVENTION

Many consumers want personal computers (PCs) to have more than one Universal Serial Bus (USB) port. Accordingly, most PC manufacturers include multiple USB ports on their PCs. If a PC has only a single USB port, a USB hub/repeater is often used to expand the single port into multiple ports.

One difficulty associated with hub/repeaters and with PCs-having multiple USB ports is that each individual USB port requires dedicated data recovery and buffering circuitry to support the transmission of data across the port. This dedicated circuitry increases the power consumption of Hub/repeaters and multiple USB PCs over single port models. Moreover, the additional circuitry takes up more space; a disadvantage in today's market, which puts a premium on streamline devices. This increases the power consumption of PCs and hub/repeaters and utilizes more space. Accordingly, there is a need for a device and method that allows multiple USB ports to utilize a single data recovery circuit and elasticity buffer.

SUMMARY OF THE INVENTION

The present invention in one example comprises a method for routing data in a device having a plurality of ports. In the method, a signal is received at a first port. The receipt of the signal at the first port is detected, and the signal is selectively routed from the first port to a data recovery circuit.

In another example, the present invention comprises a data recovery module. The data recovery module comprises a plurality of input components and data recovery circuit. A routing circuit, coupled between the input components and the data recovery circuit, routes signals received by the input components to the data recovery circuit.

In another example, the present invention comprises a system for routing data in a device having a plurality of parts. The system comprises means for receiving a signal at a first port; means for detecting that the first port is receiving the signal; and means for selectively routing the signal from the first port to the data recovery circuit.

In another example, the present invention comprises a method for extracting data in a hub repeater having a plurality of ports and a single data recovery circuit. In the method, a first signal is received at a downstream port of the hub repeater. It is detected that the first signal is received at the downstream port, and a transmission path is created between the second downstream port and the data recovery circuit.

DETAILED DESCRIPTION

A detailed description of several examples of the present invention is now provided for illustrative purposes.

Figure 1:
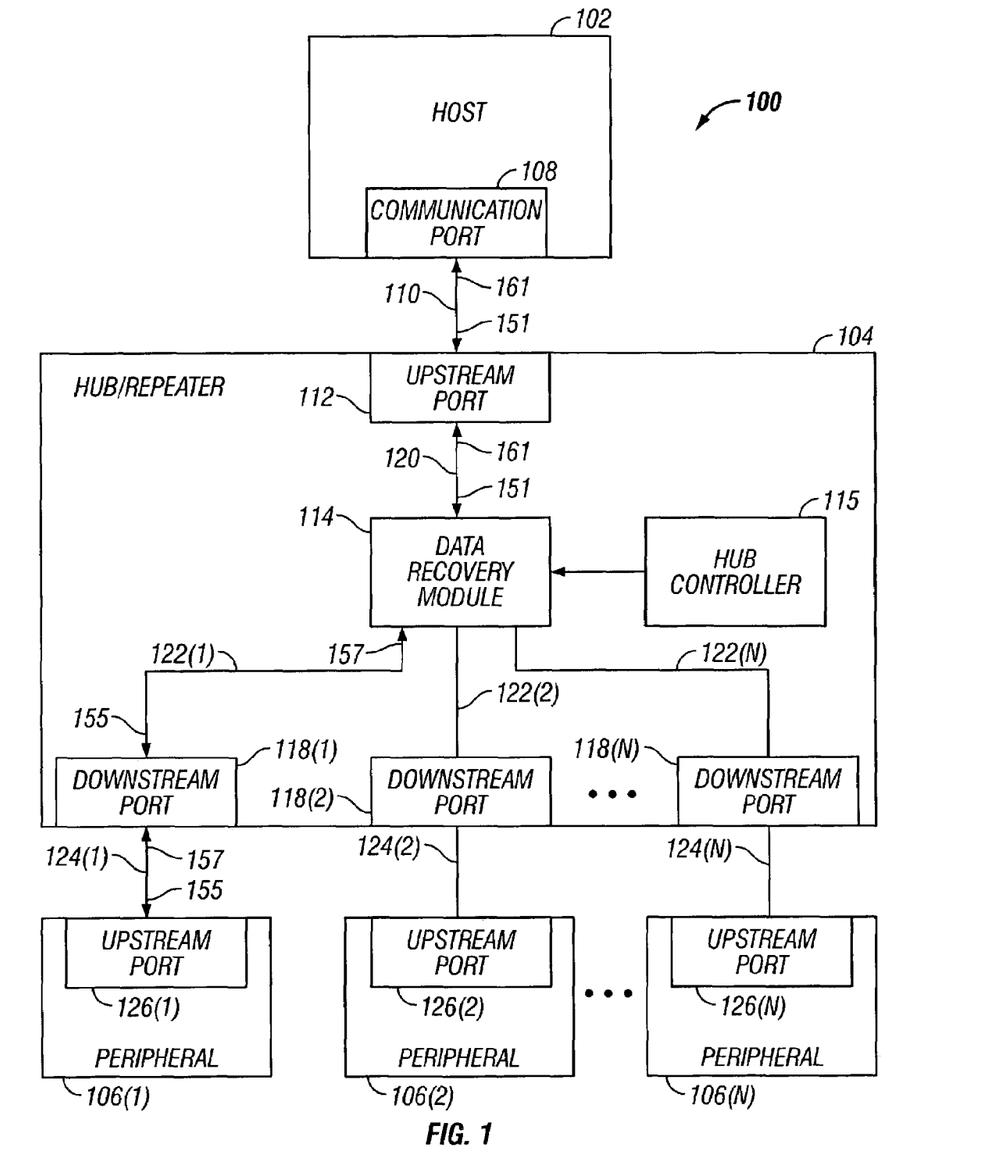
FIG. 1 is a functional block diagram of an exemplary system including a host, a hub/repeater having a data recovery module, and a plurality of peripherals.

Referring to FIG. 1, in one example system 100 comprises a host 102, hub 104, and one or more peripherals 106(1)-106 (N). System 100 is constructed of a plurality of components, such as computer software and/or hardware components. A number of such components can be combined or divided if necessary. An exemplary component of system 100 could employ and/or comprise a series of computer instructions written in or implemented with any of a number of programming languages, as will be appreciated by those of skill in the art.

The discussion that follows describes communication between host 102 and peripherals 106(1)-106(N) over a USB 2.0 interface, and through a USB 2.0 hub. This should not be viewed as limiting the disclosure to implementations utilizing the Universal Serial Bus (USB) 2.0 standard. System 100 could also be implemented using the USB 1.0 standard, the USB 1.1 standard. Future versions of the USB standard and other standards, such as the IEEE 1394 standard. The USB standards are hereby incorporated by reference and are available from the USB Implementer's Forum (USB-IF) of Portland, Oreg.

Referring still to FIG. 1, host 102 in one example comprises a personal computer. In another example, host 102 comprises any device having one or more Universal Serial Bus (USB) ports utilized to connect host 102 to one or more USB compatible peripheral devices, either directly or through a USB hub.

Host 102 includes a downstream port 108 coupled to hub/repeater 104 through interface 110. Interface 110 in one example is a USB 2.0 interface, although as stated above, this disclosure is not meant to limit interface 110 to a USB 2.0 interface.

Hub/repeater 104 expands the number of peripherals 106 (1)-106(N) connectable to downstream port 108. Hub/repeater 104 includes upstream port 112,which is coupled to host 102 through interface 110. Hub/repeater 104 in one example is compatible with the USB 2.0 standard, although, as stated above, hub/repeater 104 could be compatible with other standards. Hub/repeater 104 further includes data recovery module 114, hub controller 116, and downstream ports 118(1)-118(N).

Data recovery module 114 extracts data from signals received by hub/repeater 104, buffers the data, and transmits the data to its final destination as will be further discussed herein. Data recovery module 114 is coupled to upstream port 112 through interface 120 and to each downstream port 118 (1)-118(N) through corresponding interfaces 122(1)-122(N).

Referring further to FIG. 1, hub controller 116 directs the overall operation of hub/repeater 104. For example, hub controller 116 informs data recovery module 114 which downstream ports 118 are connected to a peripheral 106. In one example hub/repeater 104 and hub controller 116 operate in accordance with the USB 2.0 specification.

Downstream ports 118(1)-118(N) are coupled to corresponding peripherals 106(1)-106(N) through interfaces 124 (1)-124(N). Downstream ports 118(1)-118(N) in one example are USB 2.0 ports. Interfaces 124(1)-124(N) essentially replicate interface 110, which connects host 102 to hub/repeater 104. For example, if interface 110 is a USB 2.0 interface, interfaces 124(1)-124(N) are USB 2.0 interfaces.

Accordingly, multiple USB 2.0 peripherals can communicate with host 102 through downstream port 108.

Peripherals 106(1)-106(N) provide a peripheral function to host 102. Examples of peripherals 106(1)-106(N), include but are not limited to, printers, scanners, digital cameras, and the like. Peripherals 106(1)-106(N) in one example are compatible with the USB 2.0 standard. Peripherals 106(1)-106(N) each include upstream port 126. Each upstream ports 126 is connected to hub/repeater 104 through interfaces 124(1)-124(N).

Referring still to FIG. 1, exemplary operation of system 100 will now be described for illustrative purposes.

System 100 operates such that host 102 and peripherals 106 exchange signals in the course of one or more transactions. The signals include data, token, and/or handshake packets which are transmitted either from host 102 to peripheral 106(1)-106(N), or from peripheral 106(1)-106(N) to host 102. In one example host 102 and peripherals 106(1)-106(N) exchange signals in accordance with the USB 2.0 specification and the Enhanced Host Controller Interface (EHCI) specification, which is incorporated herein by reference and is available from the USB-IF. Examples of signals that host 102 sends to peripherals 106(1)-106(N) include but are not limited to are a personal computer sending a print job to a printer or sending a command to a scanner to begin a scan job. Examples of signals that 106(1)-106(N) send to host 102 include, but are not limited to, a digital camera sending picture data to host, or a printer sending an out-of-paper signal.

The following discussion will for illustrative purposes describe a transaction between host 102 and peripheral 106 (1). The operating description of system 100 is essentially the same regardless of the particular peripheral to which host 102 sends a signal. For example, when a signal is sent to peripheral 106(1) signal flow is described with respect to the interfaces and ports corresponding to peripheral 106(1) (i.e., 122 (1), 118(1), 124(1), etc.) For a signal sent to peripheral 106 (2), signal flow would be described with respect to the interfaces and ports corresponding to peripheral 106(2) (i.e., 122(2), 118(2), 124(2), etc.). This is also the case with respect to any additional peripherals 106(N) connected to host 102 (transaction would be described with respect to interface 122(N), port 118(N), and interface 124(N)).

Still referring to FIG. 1, when host 102 sends signal 151 to peripheral 106(1) from downstream port 108 over interface 110. Signal 151 in one example comprises a token, handshake, or data packet. For illustrative purposes, signal 151 will be described as a data packet, and peripheral 106(1) will be described as a USB 2.0 peripheral operating in high speed (HS) mode; therefore signal 151 has a data rate of 480 Mbps.

Hub/repeater 104 receives signal 151 at upstream port 112. Signal 151 passes through upstream port 112 over interface 120 to data recovery module 114. Data recovery module 114 detects that signal 151 is received through upstream port 110, creates a differential output signal, routes the differential output signal to a data recovery circuit, and performs data recovery on the differential signal. Data recovery module 114 then sends a recovered data signal 155 to each downstream port 118 that is active and enabled and has a HS peripheral attached.

In the present example, it should be noted that the USB 2.0 specification does not allow full speed (FS) or low speed (LS) devicesperipherals to receive high speed data;, the specification alsoand does not allow disabled ports to receive data. To simplify the present example, it will be assumed downstream ports 118(2)-118(N)(N) are either disabled or have FS/LS devices attached. In this case, data recovery module 114 transmits the recovered data signal 155 over interface 122(1) to downstream port 118(1) for eventual receipt by peripheral 106(1). If, on the other hand, all downstream ports 118(1)-118(N) arewere enabled with HS devices connected thereto, data recovery module 114 would transmit recovered data signal 155 over each interface 122(1)-122(N) to downstream ports 118(1)-118(N) for eventual receipt by peripherals 106(1)-106(N).

For illustrative purposes, a transaction will be now be described in which peripheral 106(1) sends a data packet to host 102. System 100 operation is the same regardless of the particular peripheral 106 which sends the data packet with the exception of the particular interfaces or ports used to relay the message. For example, when a signal is sent from peripheral 106(1) signal flow occurs over the interfaces and ports corresponding to peripheral 106(1) (e.g., 122(1), 118(1), 124(1), etc.) If a signal were sent from peripheral 106(2), signal flow would occur over the interfaces and ports corresponding to peripheral 106(2). This is also the case with respect to any additional peripherals 106(N) (i.e., interface 122(N), port 118(N), and interface 124(N) would be used to send signals).

When peripheral 106 (1) sends signal 157 to host 102, peripheral 106(1) transmits signal 157 over interface 124 (1) to downstream port 118 (1). Data recovery module 114 detects that the receipt of signal 157 at downstream port 118 (1). and receives signal 157 over interface 122(1). Data recovery module 114 converts signal 157 to a differential signal, routes the differential signal to a data recovery circuit, and performs data recovery on signal 157. Data recovery module 114 then determines that the upstream port 112 is the correct port to send data recovered from signal 157. Data recovery module 114 then transmits recovered data signal 161 through upstream port 112 over interface 110 to host 102.

Figure 2:
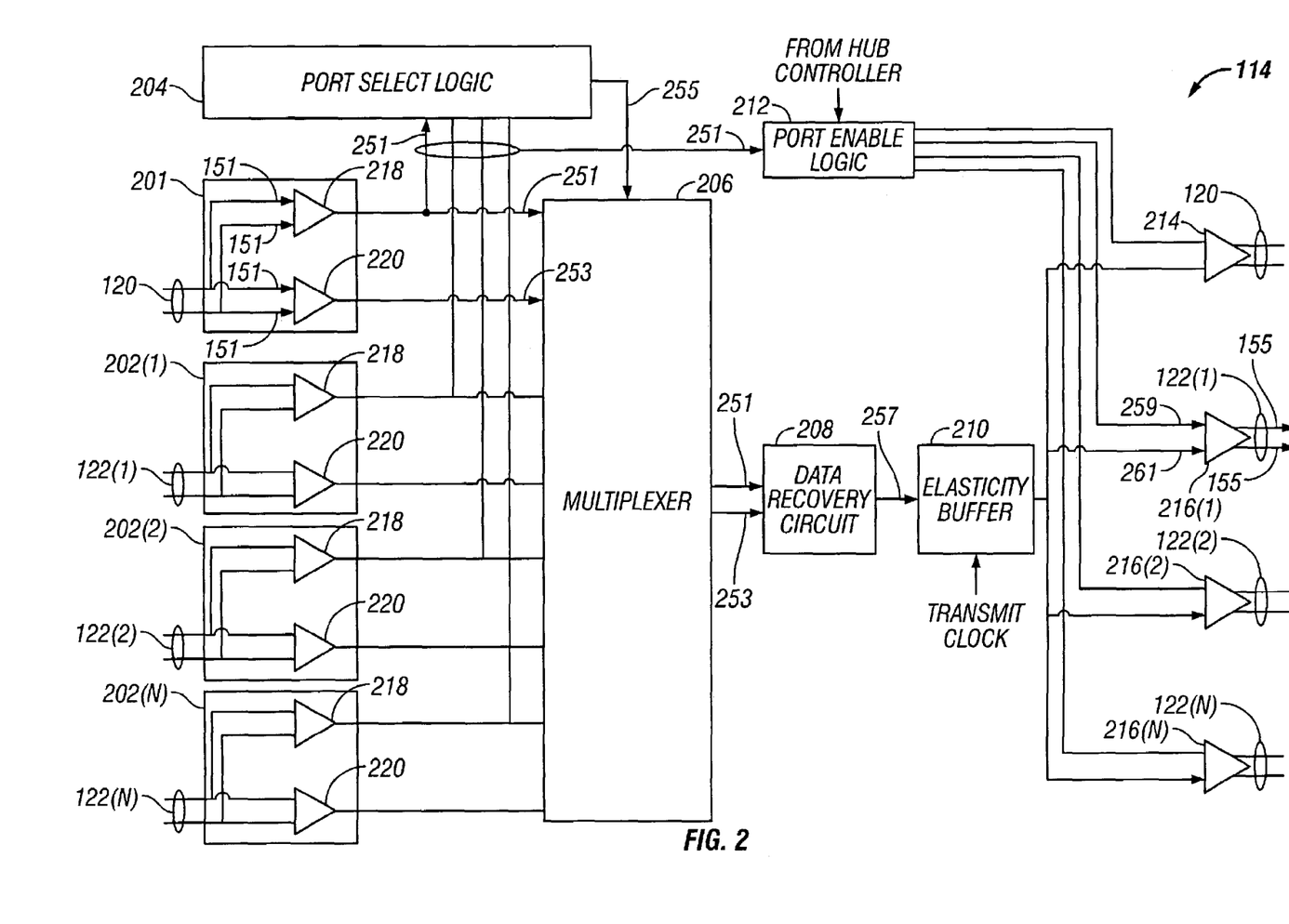
FIG. 2 is a functional block diagram of the data recovery module of FIG. 1 depicting exemplary signal flow from the host to a peripheral.

FIG. 2 shows one example of data recovery module 114. Data recovery module 114 comprises upstream input component 201, a plurality of downstream input components 202(1)-202(N), port select logic 204, multiplexer 206, data recovery circuit 208, elasticity buffer 210, port enable logic 212, upstream transmitter 214, and downstream transmitters 216(1)-216(N).

Referring to FIGS. 1 and 2, upstream input component 201 corresponds to upstream port 112. Upstream input component 201 is coupled to upstream port 112 over interface 120.

Each downstream input component 202(1)-202(N) corresponds to one of downstream ports 118(1)-118(N). Hence, if hub/repeater 104 has three downstream ports118(1)-118(3), there will be three downstream input components 202(1)-202(3). Input components 202(1)-202(N) are respectively coupled to downstream ports 118(1)-118(N) through respective interfaces 122(1)-122(N).

Upstream input component 201 and downstream input component 202(1)-202(N) each comprise squelch detector 218 and differential receiver 220. Squelch detector 218 and differential receiver 220 of upstream input component 201 are coupled in parallel to upstream port 112 through interface 120. Squelch detector 218 and differential receiver 220 of each downstream input component 202(1)-202(N) are each coupled to a corresponding downstream ports 118(1)-118(N) through corresponding interfaces 122(1)-122(N). Signals received from upstream port 112 and downstream ports 118(1)-118(N) are received at the respective inputs of squelch detector 218 and differential receiver 220. Each squelch detector 218 and differential receiver 220 has an output coupled to multiplexer 206. Each squelch detector 218 also has an output coupled to an input of port select logic 204.

System 100 utilizes squelch detector 218 to detect when signals are received at a particular port. For instance, squelch detector 218 of upstream input component 201 detects when a signal is received at upstream port 112, and squelch detector 218 of downstream input component 202(1) detects when a signal is received at downstream port 118(1). When a signal is received at a port, squelch detector 218 informs port select logic 204 of the presence of the signal and enables data recovery circuit 208. Meanwhile, in parallel, corresponding receiver 220 converts received signals to differential output signals and sends them to multiplexer 206.

Port select logic 204 is coupled between an output of each input component 201, 202(1)-202(N) and multiplexer 206. Port select logic 204 serves to command multiplexer 206 to route signals from the upstream port 112 and downstream ports 118(1)-118(N) to data recovery circuit 208.

Multiplexer 206 is coupled between each input component 201, 202(1)-202(N), and data recovery circuit 208. An input of Multiplexer 206 is also coupled to an output of port select logic 204. Multiplexer 206 acts as a routing circuit to route signals received by each input component 201, 202 to data recovery circuit 208.

Data recovery circuit 208 performs data and clock recovery on signals received from multiplexer 206. Data recovery circuit 208 in one example comprises a delay locked loop (DLL) circuit.

Elasticity buffer 210 acts as a rate matching device to match data from data recovery circuit 208, which has a first clock rate (the receive clock rate) to a second clock rate (the transmit clock rate). Accordingly, data is clocked into elasticity buffer 210 at a receive clock rate and is clocked out at a transmit clock rate. Elasticity buffer 210 in one example is a first-in first-out (FIFO) memory.

An input of port enable logic 212 is coupled to an output of each squelch detector 218. Another input of port enable logic 212 is coupled to an output of hub controller 116. An output of port enable logic is coupled to an input of each transmitter 214, 216(1)-216(N). Port enable logic 212 selectively enables each transmitter 214, 216(1)-216(N) in accordance with instructions it receives from hub controller 116 and port select logic 204.

A description of exemplary operation of data recovery module 114 will now be provided.

Data recovery module 114 receives and transmits signals in two directions: First it receives transmissions from host 102 over upstream port 112 and sends recovered data through downstream ports 118(1)-118(N) to peripherals 106(1)-106(N). Second, it receives transmissions from peripherals 106(1)-106(N) through downstream ports 118(1)-118(N) and sends recovered data to host 102.

A transmission from host 102 to peripheral 106(1) will now be described in connection with data signal 151. For purposes of illustration, signal 151 is described as containing data intended for peripheral 106(1). It should be understood, however, that signal 151 could alternatively be intended for peripheral 106(2) or peripheral 106(N). The operation of data recovery module 114 is the same with the exception of the particular interfaces used to convey the signals to the particular peripheral. Moreover, signal 151 could alternatively be a token or handshake packet.

When host 102 transmits signal 151 to peripheral 106(1), hub/repeater 104 receives signal 151 at upstream port 112. Input component 201 of data recovery module 114 then receives signal 151 from upstream port 112 over interface 120. At this point, respective inputs of squelch detector 218 and differential receiver 220 both receive signal 151. Squelch detector 218 thereby detects that upstream port 112 received signal 151, and sends signal 251 to port select logic 204 and multiplexer 206. Signal 251 serves two purposes: It indicates to port select logic 204 that a transmission is being received by hub/repeater 104 at upstream port 112. Second, it enables data recovery circuit 208.

Differential receiver 220 also receives signal 151 and in response generates signal 253. Signal 253 is a differential version of signal 151 and contains the information contained in signal 151, whether it is a token, data, and handshake packet. Port select logic 204, upon receiving signal 251, becomes aware that upstream port 112 has received a transmission and sends signal 255 to multiplexer 206. Signal 255 is a port select command that causes multiplexer 206 to selectively route signal 251 and signal 253, to data recovery circuit 208 by creating a transmission path between upstream port 112 and data recovery circuit 208. Signal 251 enables data recovery circuit 208 which then performs data recovery on signal 253. After performing data recovery on signal 253, data recovery circuit transmits signal 257 to elasticity buffer 210. Signal 257 comprises a signal containing recovered data from signal 253.

Meanwhile, port enable logic 212, which is aware from the hub controller that downstream port 118(1) has a HS peripheral 106(1) connected, receives signal 251. Thereby, port enable logic 212 realizes that a transmission from host 102 has been received on upstream port 112. Port enable logic 212 in response sends signal 259 to transmitter 216(1), which is coupled to downstream port 118(1) through interface 122(1). Signal 259 then enables transmitter 216(1). It should be noted that if downstream ports 118(2)-118(N) have HS peripherals attached, port enable logic 212 would send signal 259 to transmitters 216(2)-216(N), which would be enabled in addition to transmitter 216(1).

Turning back to the description, after receiving signal 257, elasticity buffer 210 matches (synchronizes) the rate of signal 257, which contains the recovered data, to the transmit clock. Elasticity buffer 210 then outputs signal 261, which contains the recovered data and is synchronized to the transmit clock, to each transmitter 212, but since only transmitter 212(1) was enabled by port enable logic 212, only transmitter 212(1) responds to receipt of signal 261. Transmitter 212(1) then creates signal 155 which contains the recovered data and is formatted for transmission over interface 122(1). Signal 155 is then sent through interface 122(1) to downstream port 118 (1). Peripheral 106(1) then receives signal 155 over interface 124(1) from downstream port 118(1). Thus peripheral 106(1) receives the data intended for it by host 102.

Figure 3:
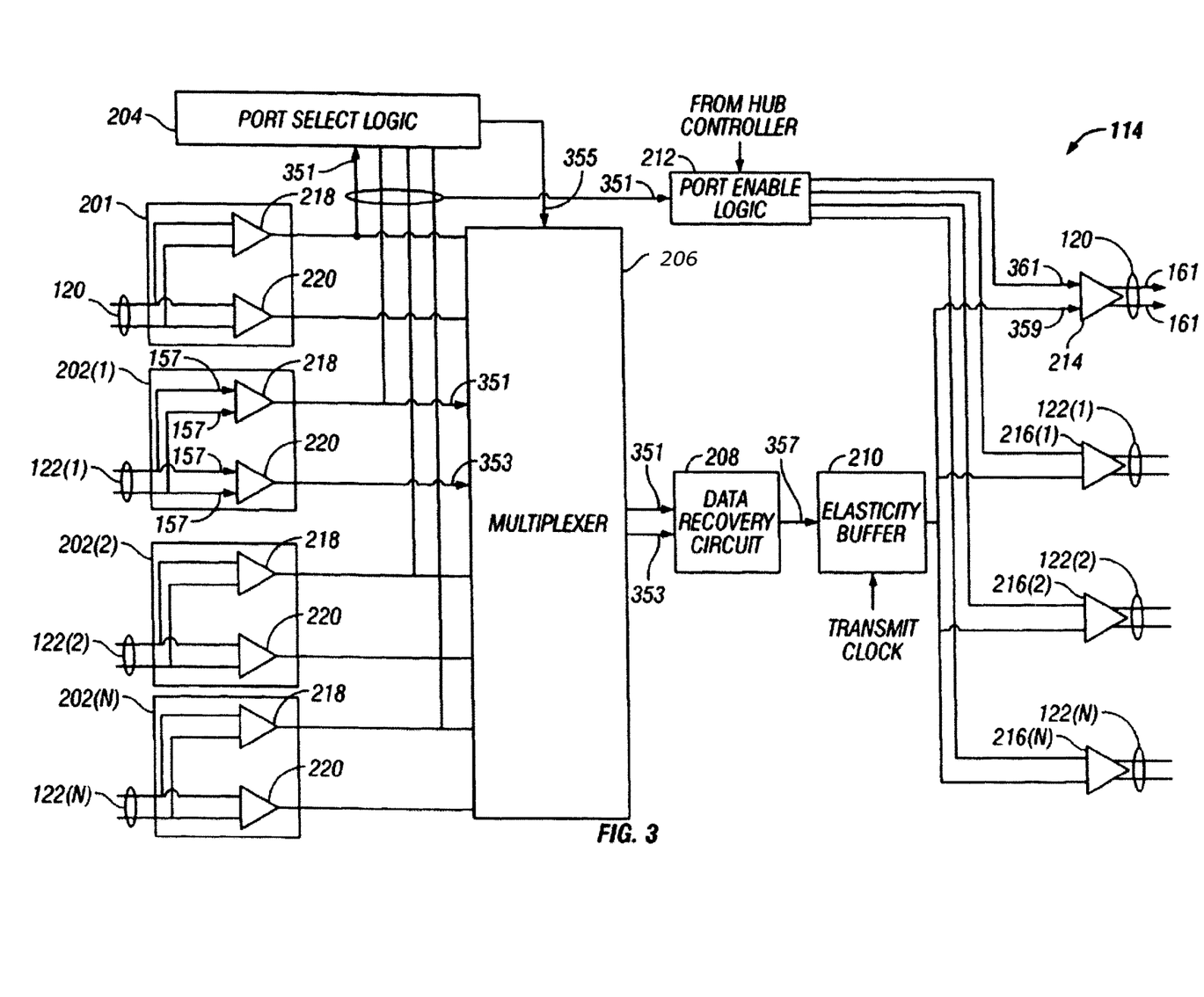
FIG. 3 is a functional block diagram of the data recovery module of FIG. 1 depicting exemplary signal flow from a peripheral to the host.

Referring now to FIGS. 1 and 3, a description of a data transmission from peripheral 106(1) to host 102 is now provided. For illustrative purposes, peripheral 106 (1) will be described as sending a data transmission to host 102. It should be noted, however, that the transmission could emanate from peripherals 106 (2)-106 (N). As was stated previously, the operation of data recovery module 114 would remain the same with the exception that the transmission would arrive at a different downstream port 118(1)-118(N)and be routed over different interfaces to data recovery module 114. Moreover, the transmission could be the transmission of a token or handshake packet. The description is now provided with reference to data, signal 157 which was described in connection with FIG. 1 as being transmitted from peripheral 106(1) to host 102.

When peripheral 106(1) sends signal 157 to host 102 it is first received at downstream port 118(1). Respective inputs of squelch detector 218 and differential receiver 220 of input component 202(1) both receive signal 157. Squelch detector 218 thereby detects that downstream port 118(1) has received signal 157 and sends signal 351 to port select logic 204 and multiplexer 206. Signal 351 indicates to port select logic 204 that hub/repeater 104 is receiving a transmission from peripheral 106(1) at downstream port 118(1). Differential receiver 220 of input component 202(1) also receives signal 157, in parallel, and sends signal 353 to multiplexer 206. Signal 353 in one example is a differential representation of signal 157, and contains the informational in content of signal 157.

Port select logic 204 upon receiving signal 351 realizes that downstream port 118(1) has received signal 157 and sends signal 355 to multiplexer 206. Signal 355 is a port select command that causes multiplexer 206 to selectively route signal 351 and 353 to data recovery circuit 208 by creating a transmission path between downstream port 118(1) and data recovery circuit 208.

Data recovery circuit 208 thereby receives signal 351 and is enabled. Data recovery circuit 208 then performs data recovery on signal 353, and sends signal 357 to elasticity buffer 210. Signal 357 in one example comprises a recovered data signal that contains data from signal 353. Elasticity buffer 210 receives signal 357 and matches (synchronizes) the data rate of signal 357, which contains the recovered data, to the transmit clock. Elasticity buffer 210 then transmits recovered data, in the form of signal 359 to transmitter 214. Signal 359 is a version of signal 357 that has been synchronized to the transmit clock.

Since port enable logic 212 also receives signal 351 from squelch detector 214 of input component 202(1), port enable logic 212 is aware of receipt of signal 157 by hub/repeater 104. Accordingly, port enable logic 212 sends signal 361 to transmitter 214. Signal 361 enables transmitter 214, which also receives signal 359. Transmitter 214 formats signal 359 for transmission to upstream port 112 over interface 120. Accordingly, host 102 receives signal 161 over interface 110, and thus receives the data sent from peripheral 106(1).

It should be noted that this disclosure is not meant to limit data recovery module 114 to receiving and routing a single transmission between host 102 and peripherals 106. Data recovery module 114 can receive and route a plurality of successive transmissions from host 102 or peripherals 106. For instance, hub/repeater 104 may receive a signal at a first port (either upstream or downstream). A squelch detector 218 would detect that the first port received the signal. Multiplexer 206 would then selectively route the signal from the first port to the data recovery circuit. Subsequently, hub/repeater 104 may receive another signal at either the same port or a second port (either upstream or downstream). A squelch detector 218 would detect that the port received the other signal. The other signal would then be selectively routed to the data recovery circuit 208.

Figure 4:
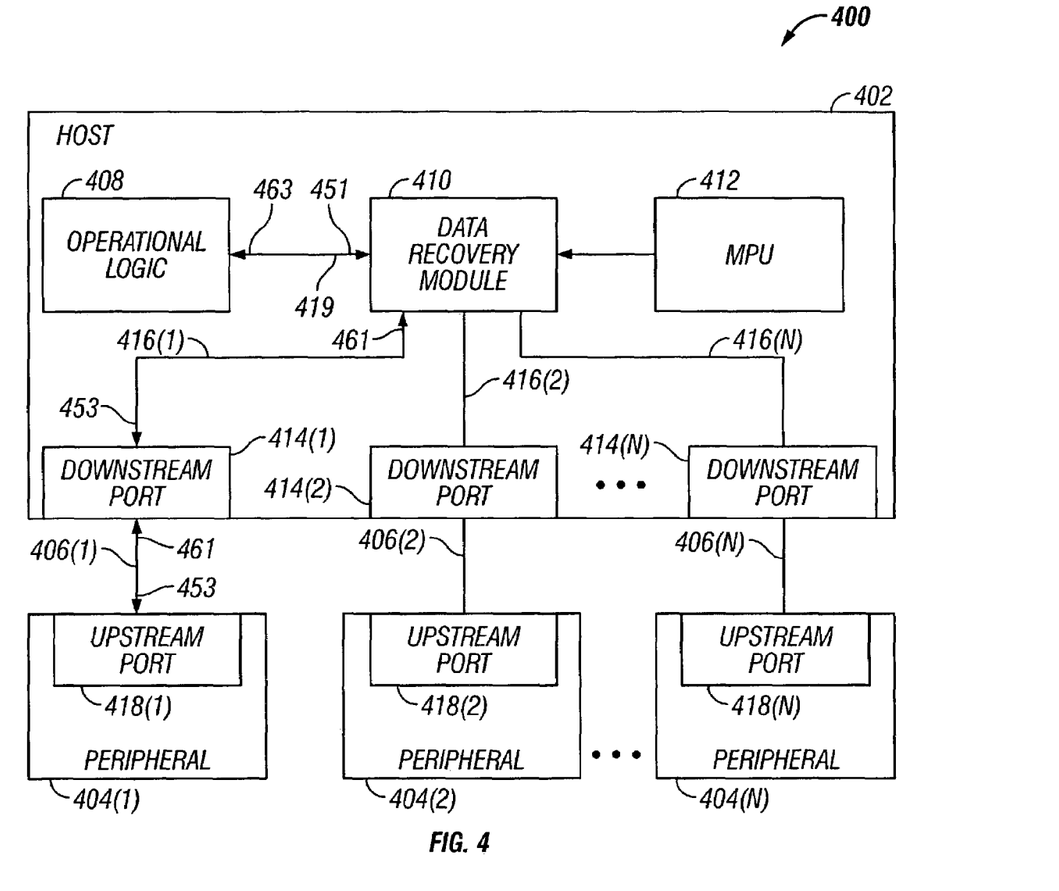
FIG. 4 is a functional block diagram of an exemplary system including a host, having a data recovery module, connected to a plurality of peripheral devices.

Turning now to FIG. 4, a system 400 is shown implementing data recovery module 410 in host 402 rather than in a hub/repeater. Such a configuration allows host 402 to support multiple downstream ports with a single data recovery circuit and elasticity buffer.

Referring still to FIG. 4, system 400 comprises host 402 and peripherals 404(1)-404(N) coupled directly to host 402 through interfaces 406(1)-406(N). Host 402 in one example is a PC, peripherals 404(1)-404(N) are USB 2.0 compatible peripherals, and interfaces 406(1)-406(N) are USB 2.0 interfaces. This disclosure, however, is not meant to limit host 402, peripherals 404(1)-404(N), and interfaces 406(1)-406(N) to what is shown. Host 402 could be any device capable of operating peripherals 404(1)-404(N). Peripherals 404(1)-404(N) and interfaces 406(1)-406(N) could be compatible with other versions of the USB or with other standards, such as IEEE 1394.

Host 402 comprises operational logic 408, data recovery module 410, microprocessor unit (MPU) 412, and a plurality of downstream ports 414(1)-414(N). Downstream ports 414(1)-414(N) are coupled to data recovery module 410 through corresponding interfaces 416(1)-416(N).

Operational logic 408 in one example comprises standard components utilized by a personal computer, such as a central processing unit (CPU), random access memory (RAM), read only memory (ROM), various digital signal processors (DSPs), and the like.

MPU 412 performs a similar function as hub controller 116 in FIG. 1. MPU 412 informs data recovery module 410 of which downstream ports 414 have peripherals connected. It should be noted that MPU 412 does not have to be a distinct component. Rather, some portion of operational logic 408, such as CPU, an ASIC, etc. could inform data recovery module 410 of which downstream ports 414(1)-414(N) have peripherals attached.

Each downstream port 414(1)-414(N) is coupled to a peripheral 404(1) through one of the corresponding interfaces 406(1)-406(N). Therefore, if host 402 has three downstream ports 414(1)-414(3), downstream port 414(1) will be coupled to peripheral 404(1) through interface 406(1), downstream port 414(2) will be coupled to peripheral 404(2) through interface 406(2), and downstream port 414(3) will be coupled to peripheral 404(3) through interface 406(3).

As in the previous example, peripherals 404 each provide a function to host 402, such as printing, scanning, uploading pictures, etc. Each peripheral 404(1)-404(N) has an upstream port 418(1)-418(N) connected to host 402 through a corresponding interface 406(1)-406(N).

The operation of system 400 is now described for illustrative purposes As with the example shown in FIGS. 1-3, the exchange of signals between host 402 and peripherals 404(2)-404(N) is similar to an exchange of signals with peripheral 401(1) with the exception of the ports and interfaces used.

When host 402 transmits a signal to peripheral 404(1), a parallel data signal 451 is sent from operational logic 408 to data recovery module 410. Data recovery module 410 receives signal 451 over interface 419, converts signal 451 from a parallel to a serial signal, and routes serial signal 453 to each downstream port 404(1)-404(N) that is enabled.

When peripheral 404(1) sends signal 461 to host 402, host 402 receives signal 461 through interface 406(1) at downstream port 414(1). Data recovery module 410 detects that signal 461 has been received at port 414(1). Data recovery module 410 receives signal 461 over interface 416, converts signal 461 to a differential signal, and routes the differential signal to a data recovery circuit; data recovery is performed, and a recovered data signal 463 is sent to operational logic 408 over interface 419.

Figure 5:
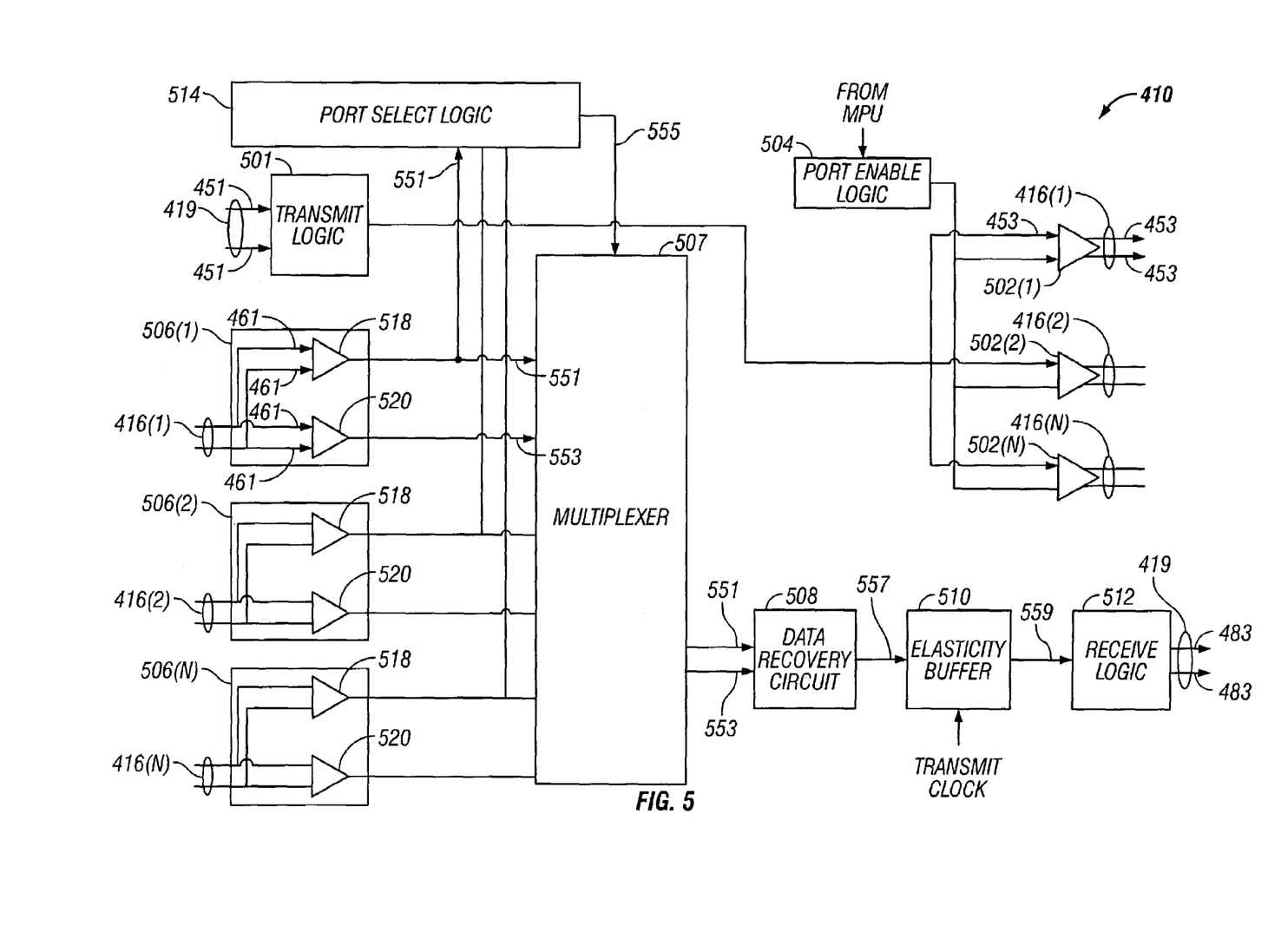
FIG. 5 is a functional block diagram of the data recovery module shown in FIG. 4 depicting exemplary signal flow from the host to a peripheral.

FIG. 5 depicts one example of data recovery module 410. Data recovery module 410 comprises transmit logic 501, a plurality of downstream transmitters 502(1)-502(N), port enable logic 504, a plurality of input components 506(1)-506(N), multiplexer 507, data recovery circuit 508, elasticity buffer 510, receive logic 512, and port select logic 514.

Referring to FIGS. 4 and 5, transmit logic 501 is coupled to operational logic 408 through interface 419. Transmit logic 501 in one example comprises a parallel-to-serial converter.

An input to each downstream transmitter 502(1)-502(N) is coupled to an output of transmit logic 501. Another input of each downstream transmitter 502(1)-502(N) is coupled to an output of port enable logic 504. An output of each downstream transmitter 502(1)-502(N) is coupled to a respective downstream port 414(1)-414(N) via a corresponding interface 416(1)-416(N).

An input to port enable logic 504 is coupled to an output of MPU 412. An output of port enable logic 504 is coupled to an input of each differential transmitter 502(1)-502(N). Port enable logic 504 enables transmitters 502(1)-502(N), which have HS peripherals connected, when signals are sent from host 402 to a peripheral 404(1)-404(N).

Each downstream input component 506(1)-506(N) is coupled to a corresponding one of downstream ports 414(1)-414(N) through a corresponding interface 416(1)-416(N). Hence, if host 402 has three downstream ports 414(1)-414(3), there will be three downstream input components 506(1), 506(2), 506(3). Each downstream input component 506(1)-506(N) comprises squelch detector 518 and differential receiver 520. Squelch detector 518 and differential receiver 520 of each downstream input component 506(1)-506(N) are coupled to a corresponding downstream port 414(1)-414(N) through corresponding interfaces 416(1)-416(N).

Signals received from downstream ports 414(1)-414(N) are received at the inputs of squelch detector 518 and differential receiver 520. Squelch detector 518 and differential receiver 520 each have an output coupled to multiplexer 507. Each squelch detector 518 also has an output coupled to an input of port select logic 514.

System 400 utilizes squelch detectors 518 to detect when a signal is received from downstream ports 414 to inform port select logic 514 of the presence of the signal, and to enable data recovery circuit 508. For instance, squelch detector 518 of downstream input component 502(1) detects when a signal is received at downstream port 414(1) informs port select logic 514 of the presence of the signal, and enables data recovery circuit 508. Meanwhile, in parallel, corresponding receiver 520 converts received signals to differential output signals and sends the differential output signals to multiplexer 507.

Port select logic 514 is coupled between an output of each of the input components 506(1)-506(N), and multiplexer 507. System 400 utilizes port select logic 514 to command multiplexer 507 to route signals from peripherals 404(1)-404(N) to data recovery circuit 508.

Multiplexer 507 is coupled between input components 506(1)-506(N) and data recovery circuit 508. Multiplexer 507 acts as a routing circuit to route signals received by each input component 506(1)-506(N) to data recovery circuit 508.

Data recovery circuit 508 performs data and clock recovery on signals received from multiplexer 507. Data recovery logic 508 in one example comprises a delay locked loop (DLL).

Elasticity buffer 510 acts as a rate matching device to match data from data recovery circuit 508, which has a first clock rate (the receive clock rate) to a second clock rate (the transmit clock rate). Accordingly, data is clocked into elasticity buffer 510 at the receive clock rate and is clocked out at the transmit clock rate. Elasticity buffer 510 in one example is a first-in first-out (FIFO) memory.

Receive logic 512 is coupled to an output of elasticity buffer 510. In one example receive logic 512 comprises a serial-to parallel converter. An output of receive logic 512 is coupled to operatational logic 408 through interface 419.

Exemplary operation of data recovery module 410 will now be provided for illustrative purposes.

Referring to FIGS. 4 and 5, this disclosure will not describe a data transmission of signal 451 from a data host 402 to peripheral 404(1). Signal 451 is described as containing data that is intended for peripheral 404(1). Regardless of the particular peripheral host 402 sends data to, the operation of data recovery module 410 is essentially the same with the exception of the particular interfaces and ports used to convey the signals to the particular peripheral. Moreover, signal 451 could be a token or handshake packet.

When host 402 transmits signal 451 to peripheral 404(1), transmit logic 501 receives signal 451 from operational logic 408 over interface 419. Transmit logic 501 receives signal 451, converts signal 451 from parallel to serial, and sends serial data signal 453 to each transmitters 502(1)-502(N). Meanwhile, port enable logic 504, which is aware from MPU 412 that only downstream port 414(1) has a HS peripheral connected, sends signal 453 to transmitter 502(1). Accordingly, port enable logic 504 only enables transmitter 502(1). Therefore, only transmitter 502(1 transmits signal 453 to its corresponding downstream port 414(1). Peripheral 404(1) then receives signal 453 which contains the information (e.g., token, handshake, data, etc.) that was intended for it by host 402.

Referring still to FIGS. 4 and 5, a description of a data transmission from peripheral 404(1) to host 102 is now provided. For illustrative purposes, peripheral 404(1) will be described as sending a data transmission to host 402. It should be noted, however, that the transmission could emanate from peripherals 404(2)-404(N). As was stated previously, the operation of data recovery module 410 would remain the same with the exception that the transmission would arrive at a different downstream port and be routed over different interfaces to data recovery module 410. Moreover, the transmission could be the transmission of a token or handshake packet. The description is now provided with reference to signal 461 which was described in connection with FIG. 4 as being transmitted from peripheral 404(1) to host 402.

When peripheral 404(1) begins the transmission, signal 461 is received at downstream port 414(1) of host 402. Squelch detector 518 and differential receiver 520 of input component 506(1) receive signal 461 over interface 416(1). Squelch detector 518 detects that downstream port 414(1) has received signal 461 and sends signal 551 to port select logic 514 and multiplexer 507. Signal 551 indicates to port select logic 514 that host 402 is receiving a transmission from peripheral 404(1) at downstream port 414(1). Differential receiver 520 also receives signal 461, in parallel, and sends signal 553 to multiplexer 507. Signal 553 in one example is a differential representation of signal 461 that contains the information (e.g., token, data, handshake, etc.) in signal 461.

Port select logic 514 upon receiving signal 551 realizes that downstream port 414(1) has received signal 461 and sends signal 555 to multiplexer 507. Signals 555 is a port select command that causes multiplexer 507 to selectively route signals 551 and signal 553 to data recovery circuit 508 by creating a transmission path between downstream port 414(1) and data recovery circuit 508.

Data recovery circuit 508 thereby receives signal 551 and is enabled. Data recovery circuit 508 also receives signal 553. Data recovery circuit 508 performs data recovery on signal 553, and sends signal 557 to elasticity buffer 510. Signal 557 in one example comprises a recovered data signal that contains data recovered from signal 553. Elasticity buffer 510 receives signal 557 and synchronizes the data in signal 557 to the transmit clock. Elasticity buffer 510 then transmits synchronized recovered data, in the form of signal 559 to receive logic 512. Signal 559 in one example is a version of signal 557 that has been synchronized to the transmit clock. Receive logic 512 converts signal 559 from a serial signal to a parallel signal 463 and transmits signal 463 to operational logic 408 over interface 419. Signal 463 contains the recovered data in signal 559 but also is in a format configured for transmission over interface 419. Operational logic 408 thus receives signal 463 which contains data that was intended for host 402 from peripheral 404(1).

It should be noted that data recovery module 410 can receive and route a plurality of successive transmissions from host 402 or peripherals 404. For instance, data recovery module 410 may receive a signal at a first port or interface. A squelch detector 518 would detect that the first port received the sequel. Multiplexer 506 would then selectively route the signal from the first port or interface to the data recovery circuit 508. Subsequently, data recovery module 410 may receive another signal at either the same port/interface or a second port. Squelch detector 512 of corresponding input component 506(1)-506(N) would detect that the port/interface received the other signal. The other signal would then be selectively routed to data recovery circuit 508.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

The invention claimed is:

1. A data recovery module, comprising:
a plurality of input components;
a data recovery circuit;
a routing circuit coupled between the input components and the data recovery circuit, wherein the routing circuit routes signals received by the input components to the data recovery circuit; and
port select logic coupled between an output of each of the plurality of input components and the routing circuit,
wherein each input component is configured to generate a signal that enables the data recovery circuit and indicates to the port select logic that a transmission is being received.

2. The data recovery module of claim 1, wherein the plurality of input components each comprise:
a differential receiver; and
a squelch detector coupled in parallel to the differential receiver.

3. The data recovery module of claim 1, wherein the plurality of input components include at least two input components that are each coupled to corresponding downstream ports of a hub repeater.

4. The data recovery module of claim 3, wherein the plurality of input components include at least one input component that is coupled to an upstream port of a hub repeater.

5. The data recovery module of claim 4, wherein the plurality of input components include at least two input components that are each coupled to corresponding downstream ports of a host computer.

6. The data recovery module of claim 1, wherein the data recovery circuit comprises:
a delay locked loop (DLL) circuit.

7. The data recovery module of claim 1, wherein the routing circuit comprises: a multiplexer.

8. The data recovery module of claim 1, further comprising:
a plurality of transmitter circuits that are each coupled to an output of the data recovery circuit.

9. The data recovery module of claim 8, further comprising:
port enable logic coupled between an output of each of the plurality of input components and an input of each of the plurality of transmitter circuits.

10. The data recovery module of claim 8, wherein at least two of the plurality of transmitter circuits have an output that is coupled to a downstream port of a Universal Serial Bus (USB) hub repeater.

11. The data recovery module of claim 10, wherein one of the plurality of transmitter circuits has an output that is coupled to an upstream port of the USB hub repeater.

12. The data recovery module of claim 8, wherein the plurality of transmitter circuits are each coupled to a corresponding downstream port of host computer.

13. A system for routing data in a device having a plurality of ports, the system comprising:
means for receiving signals at a plurality of ports from a plurality of peripheral devices;
means for detecting that each port is receiving a signal; and
means for selectively routing the signal from the first port to a data recovery circuit, the means for selectively routing including port select logic,
wherein the means for detecting is configured to generate a signal that enables the data recovery circuit and indicates to the port select logic that a transmission is being received.

14. The system of claim 13, wherein the means for selectively routing comprises:
means for creating a transmission path between a port and the data recovery circuit in response to receipt of a port select command from the port select logic.

15. The system of claim 14, wherein the means for creating a transmission path comprises a multiplexer.

16. The system of claim 13, wherein the means for receiving comprises: a differential receiver.

17. The system of claim 13, wherein the means for detecting comprises: a squelch detector.

18. The system of claim 13, further comprising:
means for performing data recovery on the signal to create recovered data; and
means for determining an output port for recovered data output by the data recovery circuit.

19. The system of claim 18, further comprising:
means for enabling a transmitter connected to the output port; and
means for transmitting the recovered data over the output port.

20. The system of claim 19, wherein the means for receiving comprises:
means for receiving the signal from a host computer over a Universal Serial Bus (USB) interface.

21. The system of claim 20, wherein the means for transmitting comprises:
means for transmitting the recovered data to a USB peripheral device.

22. The system of claim 19, wherein the means for receiving comprises:
means for receiving the signal from a Universal Serial Bus (USB) peripheral.

23. The system of claim 22, wherein the means for transmitting comprises:
means for transmitting the recovered data to a host computer over a USB interface.

24. A method for extracting data in a hub/repeater having a plurality of ports and a single data recovery circuit, the method comprising the steps of:
receiving a first signal at a first downstream port of the hub repeater;

detecting that the first signal is received at the first downstream port; and creating a transmission path between the first downstream port and the data recovery circuit using port select logic, wherein detecting includes generating a signal that enables the data recovery circuit and indicates to the port select logic that a transmission is being received.

25. The method of claim 24, wherein the step of receiving the signal comprises the step of:

receiving a second signal at a second downstream port of the hub repeater;

detecting that the second signal is received at the second downstream port; and creating a transmission path between the second downstream port and the data recovery circuit using the port select logic.

26. The method of claim 24, further comprising:
recovering data contained in the first signal; and
transmitting recovered data to an upstream port of the hub/repeater.

27. The method of claim 24, further comprising:
receiving a second signal at an upstream port of the hub/repeater;
detecting that the second signal is received at the upstream port; and
creating a transmission path between the upstream port and the data recovery circuit.

28. The method of claim 27, further comprising:
recovering data contained in the second signal; and
transmitting data recovered from the second signal to one downstream port of the hub/repeater.

* * * * *